United States Patent
Rechef et al.

(10) Patent No.: US 6,199,181 B1
(45) Date of Patent: Mar. 6, 2001

(54) METHOD AND SYSTEM FOR MAINTAINING RESTRICTED OPERATING ENVIRONMENTS FOR APPLICATION PROGRAMS OR OPERATING SYSTEMS

(75) Inventors: Eran Rechef, Lehavim; Gil Raanan, Zoran; Eilon Solan, Herzlia, all of (IL)

(73) Assignee: Perfecto Technologies Ltd., Herzlia (IL)

(*) Notice: Under 35 U.S.C. 154(b), the term of this patent shall be extended for 0 days.

(21) Appl. No.: 09/150,112

(22) Filed: Sep. 9, 1998

Related U.S. Application Data

(60) Provisional application No. 60/058,280, filed on Sep. 9, 1997.

(51) Int. Cl.[7] .................................................. G06F 11/00
(52) U.S. Cl. .......................................... 714/38; 713/201
(58) Field of Search ................................ 714/38, 40, 41, 714/47, 7, 8, 11, 12, 13, 25, 26, 35; 713/200, 201, 202

(56) References Cited

U.S. PATENT DOCUMENTS

| | | | |
|---|---|---|---|
| 5,027,271 | * 6/1991 | Curley et al. ................. | 364/200 |
| 5,230,065 | * 7/1993 | Curley et al. ................. | 395/200 |
| 5,263,147 | * 11/1993 | Francisco et al. ............. | 395/425 |
| 5,278,973 | * 1/1994 | O'Brien et al. ............... | 395/500 |
| 5,522,075 | * 5/1996 | Robinson et al. ............. | 395/700 |
| 5,708,812 | * 1/1998 | Van Dyke et al. ............. | 395/712 |
| 5,809,230 | * 9/1998 | Pereira ......................... | 395/186 |
| 5,925,126 | * 7/1999 | Hsieh ............................ | 713/200 |
| 5,950,221 | * 9/1999 | Draves et al. ................. | 711/100 |
| 5,991,856 | * 11/1999 | Spilo et al. ................... | 711/147 |
| 6,049,889 | * 4/2000 | Steely, Jr. et al. ............ | 714/4 |
| 6,061,795 | * 5/2000 | Dircks et al. ................. | 713/201 |

OTHER PUBLICATIONS

Beltran A R, Microcomputer systems for interprogram communication and scheduling—provides appication programs with ability to communicate with each other, control each other and share communications hardware through common driver while providing uniform, May 1997.*

Richard A Dayan, Data processing system, Japanese patent Abstracts, JP402153434A, Jun. 1990.*

* cited by examiner

Primary Examiner—Nadeem Iqbal
(74) Attorney, Agent, or Firm—Brown Raysman Millstein Felder & Steiner LLP

(57) ABSTRACT

A method for protecting an operating environment on a processor from a rogue program operating on the processor comprising isolating simultaneously executing programs or operating systems is disclosed. Memory space for use only by the first program while the first program is executing is allocated. Communication between the first program and the computer's operating environment is accomplished through a single link employing one of several methods including using shared memory space, a dedicated interrupt or a dedicated I/O port. The monitor manages a restricted operating environment for the first program on the processor, the restricted operating environment preventing the first program from accessing resources on the processor except for the allocated memory space the single communication link.

21 Claims, 9 Drawing Sheets

METHOD AND SYSTEM FOR MAINTAINING RESTRICTED OPERATING ENVIRONMENTS FOR APPLICATION PROGRAMS OR OPERATING SYSTEMS

RELATED APPLICATIONS

This application is related to pending provisional application no. 60/058,280 titled METHOD AND APPARATUS FOR INSULATING A COMPUTER OR NETWORK FROM AN EXTERNAL COMPUTER OR NETWORK, filed Sep. 9, 1997, which is hereby incorporated by reference into this application. Applicants hereby claim the benefit of such provisional application.

BACKGROUND OF THE INVENTION

The present invention relates to computer program isolation methods. Specifically, the invention is a method and system for establishing and maintaining a restricted operating environment for a computer program to prevent the program from exploiting bugs and/or data of another computer program which shares the same hardware, while at the same time allowing some form of restricted, well-controlled communication between the programs.

Contemporary computers rely on a special set of instructions which define an operating system (O/S) in order to provide an interface for computer programs and computer components such as the computer's memory and central processing unit (CPU). Current operating systems have multi-tasking capability which allows computer programs to run simultaneously, each program not having to wait for termination of another in order to execute instructions. Multi-tasking O/S's allow programs to execute simultaneously by allowing programs to share resources with other programs. For example, an operating system running multiple programs executing at the same time allows the programs to share the computer's CPU time. Programs which run on the same system, even if not simultaneously with other programs, share space on the same permanent storage medium. Programs which are executing simultaneously are presently able to place binaries and data in the same physical memory at the same time, limited to a certain degree by the O/S restrictions and policy, to the extent that these are properly implemented. Memory segments are shared by programs being serviced by the O/S, in the same manner. O/S resources, such as threads, process tables and memory segments, are shared by programs executing simultaneously as well.

While allowing programs to share resources has many benefits, there are resulting security related ramifications. Some programs can have problems in execution due to mistakes or bugs in the program's instructions, or from conflicts with other running programs, or from ill-formatted or mischievous input handed to them. Further, some programs have been circulated which have intentionally embedded mistakes in them so that the program runs astray and becomes a so-called computer virus. Whether by mistake, or by a programmer's malicious intent, many major problems can, and often do occur, which can be traced back to these untrusted programs whose execution results are unpredictable and undesired. These problems include allowing the untrusted or rogue program: to capitalize CPU time, leaving other programs without CPU time; to read, forge, write, delete or otherwise corrupt files created by other programs; to read, forge, write, delete or otherwise corrupt executable files of other programs; and to read and write memory locations used by other programs to thus corrupt execution of those programs. As above, this may be a result of an intentionally malicious code, or a bug in an innocent code, or bad input handed to a code, or malicious input handed to a code, or a combination of these.

An example of such a scenario, where a set of trusted program has to run concurrently with a second set of untrusted programs, is a computer connected to the Internet. In this case, the computer may run an O/S, with several user applications, together comprising the trusted set of programs, concurrently with an Internet browser, possibly requiring also the execution of downloaded code, such as Java applets, or EXE/COM executables, the latter programs comprising the untrusted set. Sometimes the origin of such program cannot be verified, therefore it may be suspected of being malicious; the browser, when browsing an ill-formatted web-site or a malicious web-site may be subject to inputs that attempt to corrupt its behavior, e.g. too large input streams causing buffer overflow and possible undesired execution of code. It is desired that the execution of the untrusted programs has the least effect on the trusted programs, and this effect should be controlled and confined to a restricted form through, for example, preset file or memory locations, specific interrupts, etc.

Many security features and products are being built by software manufacturers and by O/S programmers to prevent such breaches from taking place, and to ensure the correct level of isolation between programs. Among these are generic architectonic solutions such as rings-of-protection in which different trust levels are assigned to memory portions and tasks, paging which includes mapping of logical memory into physical portions or pages, allowing different tasks to have different mapping, with the pages having different trust levels, and segmentation which involves mapping logical memory into logical portions or segments, each segment having its own trust level wherein each task may reference a different set of segments. Since the sharing capabilities using traditional operating systems are extensive, so are the security features. However, the more complex the security mechanism is, the easier it is for a rogue program to bypass the security and to corrupt other programs or the operating system itself, sometimes using these very features that allow sharing and communication between programs to do so.

Further, regarding rogue or virus programs, for virtually every software security mechanism, a programmer has found a way to subvert, or hack around, the security system, allowing a rogue program to cause harm to other programs in the shared environment. This includes every operating system and even the Java language, which was designed to create a standard interface, or sandbox, for Internet downloadable programs or applets.

The vulnerability of computer programs lies in the architecture of the computer operating system itself. A typical prior art operating system scheme is depicted in FIG. 1. The traditional, multi-tasking O/S environment includes an O/S kernel 100 loaded in the computer random access memory (RAM) at start-up of the computer. The O/S kernel 100 is a minimal set of instructions which loads and off-loads resources and resource vectors into RAM as called upon by individual programs executing on the computer, generally indicated at 102. Sometimes, when two or more executing programs require the same resource, such as printer output, O/S kernel 100 leaves the resource loaded in RAM until all programs have finished with that resource. Other resources, such as disk read and write, are left in RAM while the operating system is running because such resources are more often used than others.

The inherent problem with the prior art architecture depicted in FIG. 1 is that resources, such as RAM, or disk, are shared by programs simultaneously, giving a rogue program a pipeline to access and corrupt other programs, or the O/S itself through the shared resource. Furthermore, as the applications that are to be used in the prior art are of general nature, many features are made enabled to them by the O/S, thus in many cases bypassing the O/S security mechanism. Such is the case when a device driver or daemon is run by the O/S in kernel mode, which enables it unrestricted access to all the resources. Corruption can thus occur system wide.

SUMMARY OF THE INVENTION

Accordingly, it is an object of this invention to solve the problems with existing systems described above.

It is another object of this invention to provide a system and method for isolating multiple computer programs and operating systems executing simultaneously.

It is another object of this invention to provide true protection of multiple computer programs and operating systems executing simultaneously from untrusted and potentially rogue programs and operating systems.

It is another object of this invention to provide a simple, secured sharing environment for multiple computer programs and operating systems executing simultaneously.

It is another object of this invention to provide limited, controlled sharing of data and resources between multiple computer programs and operating systems executing simultaneously while protecting the multiple processes from each other.

It is another object of this invention to prevent defects present in one program or operating system from causing defects in another program or operating system on the same computer.

These objects and other advantages are provided by a method and system for protecting an operating environment on a processor from a first program operating on the processor. The method includes the steps of allocating memory space for use only by the first program while the first program is executing, allowing communication between the first program and the operating environment through only a single link employing a single method selected from the group consisting of a shared memory space, a dedicated interrupt, and a dedicated I/O port, and managing a restricted operating environment for the first program on the processor, the restricted operating environment preventing the first program from accessing resources on the processor except for the allocated memory space and the single communication link.

In order to create a truly secured sharing environment, the system of the present invention provides a simple, shared environment which allows very restricted resource access.

The system limits sharing capabilities to those provided directly by the hardware as opposed to the sharing capabilities supplied by the O/S or other programs, and does nothing except activating and de-activating these sharing capabilities. This results in a truly simple and secured way of running several programs on the same computer. Many aspects of the system may be formally verified, including special I/O routines which implement the format and protocol for data passing between the restricted operating environment and the remaining processing environment as well as the protocol itself.

The system does not allow traditional sharing of resources, such as disk read and write, printer output, interrupts, I/O port access, etc. Although almost any type of computer program may be implemented using the system, it is very effective for programs or operating systems which require high security and limited resources. For example, a computer running several operating systems on the same computer can divide hardware resources between those operating systems using the system of the present invention. Each operating system would only be allowed direct access to hardware resources which are different than the co-executing operating systems at the same time, while possibly using the restricted link between the programs to share access to the resource in a very controlled and restricted way. With respect to each hardware resource, the trust level or security level afforded each running operating system is different.

This same scheme may also be equally applied to multiple computer programs within one or several operating systems executing on the same computer. Each application is able to receive input, process it and then output results without any other system resource being involved.

This undisturbed hardware resource acquisition allows an implementation of a security policy wherein a first operating system or program has a different trust level or security level than a second or plurality of operating systems or programs which share the same hardware. While maintaining several programs with potentially different trust levels on the same processor, and keeping those programs separated by means of hardware mechanisms provided by the processor, the present invention allows a very restricted, highly controlled means for communication between the programs, again by exploiting mechanisms natural to the processor, thus keeping the communication mechanism relatively simple.

In the discussion below, the term "program" can be interchanged with operating system to describe an alternative embodiment unless otherwise stated for a specific feature. In the first embodiment, the system of the present invention is able to isolate a program executing in a single operating system from other programs executing in that single operating system. In an alternative embodiment, the system of the present invention is able to isolate an operating system from other operating systems executing on a computer system which may have one or several computer programs executing within each operating system.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
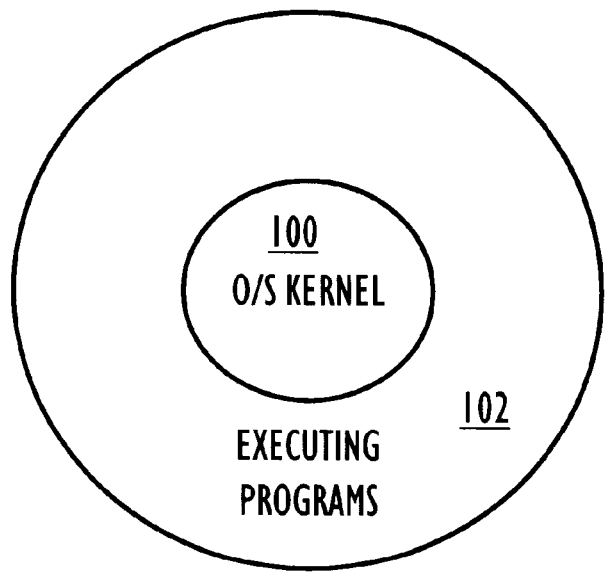
FIG. 1 is a ring diagram representing system layers of a prior art O/S kernel and application program.
Figure 2:
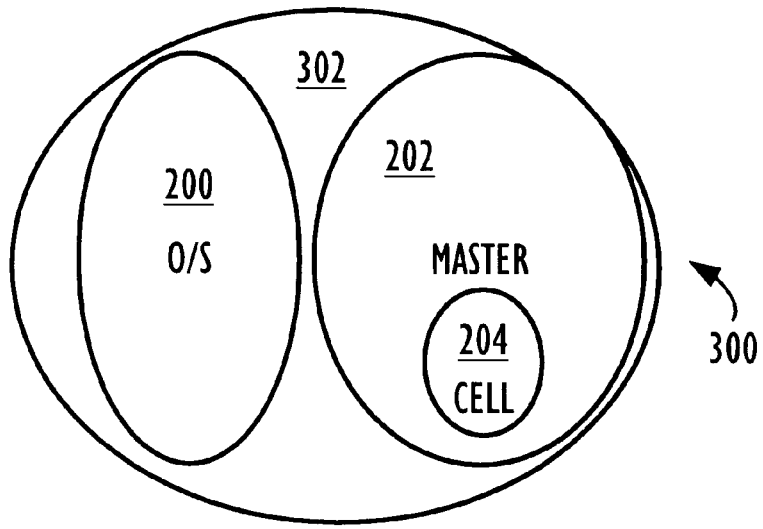
FIG. 2 is a diagram representing system layers of a first embodiment of the present invention.

With reference to FIG. 2, in a computer system 300, a first embodiment of the present invention comprises two entities, a master software program 202 controllably acting as a protective container, and a restricted operating environment or cell 204 acting as a RAM segment container through which master 202 monitors and controls programs executing inside the cell 204 container. Master 202 protects other processes, such as the computer's O/S 200, from a program executing inside cell 204. The system may be implemented on a Windows/NT system in VM86 switchable mode. A system implemented using Windows/NT may run on Intel's CPUs, 80386 and above. Master 202 switchably operates along side O/S 200 at the same priority and system level as O/S 200.

A process master 202 constructs a cell 204 and loads a program into the cell 204. Master 202 is responsible for executing the program inside cell 204, and passing data from cell 204 into an outside environment 302 comprising O/S 200, master 202, and other programs and resources such as peripherals. Master 202 is also responsible for shutting down the program and dismantling cell 204.

Figure 3:
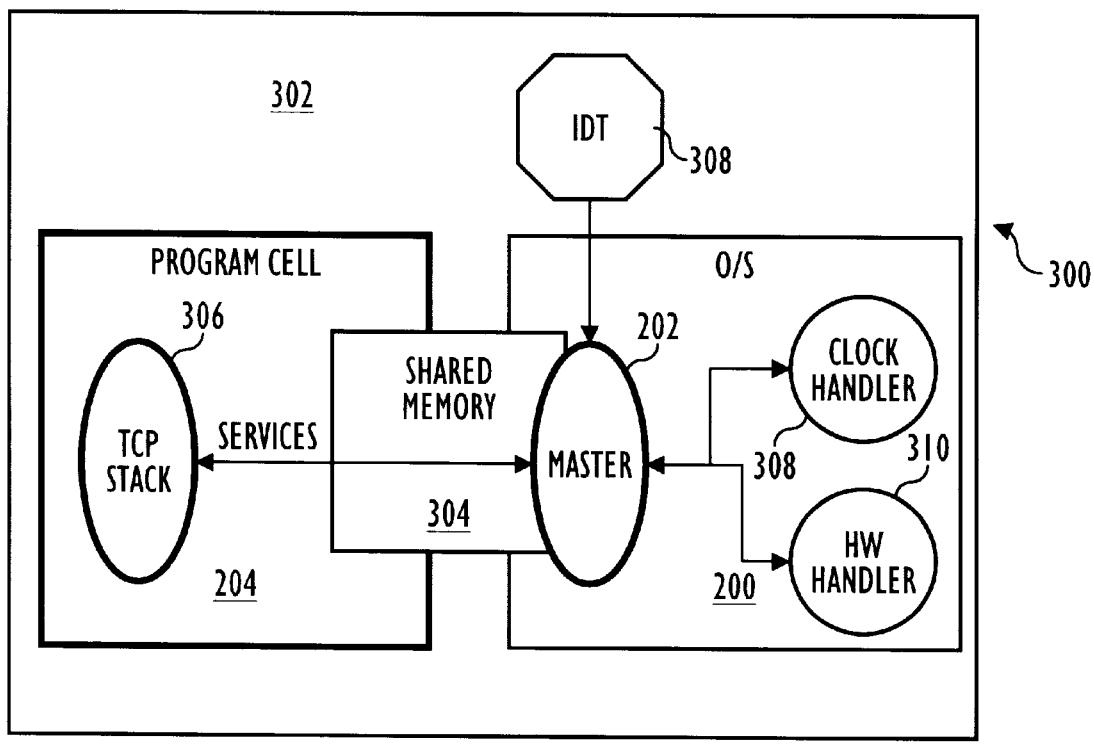
FIG. 3 is a schematic overview of the operating environment of the first embodiment of the present invention.

With reference to FIG. 3, a schematic overview of a computer 300 is depicted with an exemplary system of the present invention installed and running. Computer 300 includes an outside system environment, generally indicated at 302 which includes an operating system 200.

The processor in the following examples is assumed to be an Intel Pentium, although the examples are basically applicable to Intel's model 80386 and 80486 processors, and with the necessary modifications known to those of skill in the art, to various other CPUs.

The system depicted in FIG. 3 is executing a program in cell 204 which communicates with outside environment 302 using a link, or vector, 304, which comprises, in this example, shared memory. The program executing in this example is a TCP/IP stack driver for communicating with a hardware component, such as a network communications card. The system of the present invention is excellent for execution of such hardware driver programs because of the complexity in their software which may have many bugs and potential software conflicts with programs in outside environment 302. Master 202 acts as a mediator between an executing program in cell 204 and the outside environment 302. The exemplary program 306 executing in cell 204 includes TCP/IP communications stack which queues data for routing to an outside resource, which in this case is a network communications card. Master 202 allows passage of the information only through the well-defined, narrow, controllable link or vector 304, described in detail below.

Outside environment 302 may comprise hardware peripherals, operating systems or other computer programs. The environment is protected from the program executing in cell 204 by master 202. However, the program is able to send and receive information from environment 302 through vector 304.

Master 202, is a process in outside environment 302, executing as a privileged task, such as a device driver, and has potentially full control over at least one CPU. Master 202 may isolate cell 204 from outside environment 302, so that outside environment 302 is not aware of cell 204. O/S 200 grants master 202 an execution time-slice, during which master 202 may access resources such as the an interrupt description table (IDT) 308, which maps each interrupt to its handler and page directory tables provided in task descriptors set during initialization of the master. Master 202 then grants the time-slice to the program in cell 204. Master 202 provides a connection 304 between outside environment 302 and the program executing in cell 204. Master 202 is also responsible for cleanup once the execution of the program ends. Master 202 dismantles cell 204 after the program terminates.

Cell 204 is the loaded executable program's 306 immediate environment. Master 202 provides cell 204 with virtual interrupt handlers, or stubs, task descriptors or other resources needed within cell 204 for executing program 306. Cell 204 allows the executing program 306 to access only RAM address space assigned to it by master 202 via the page tables provided in the task descriptors loaded during setup. The means for communication for program 306 with outside environment 302 is through vector 304. Vector 304 may be either an interrupt, I/O port or a specially designated shared memory address space in RAM which can be strictly controlled and evaluated by master 202 before allowing access to the data from vector 304, or allowing the program 306 in cell 204 to access data vectored from other programs or operating system 200.

Although not necessary for operation of the present invention, the program 306 loaded for execution in cell 204 comprises software designed or adapted to run, independent of any service other than vector 304 to outside environment 302. The program 306 software cannot invoke system calls except in the case where the program is an O/S of the second embodiment discussed separately below. In the first embodiment, the program 306 cannot issue interrupts or I/O instructions unless they are part of its controlled link vector 304 to outside environment 302. The program 306 is thus confined in cell 204, and serviced by master 202.

However, even with the most CPU intensive programs, certain resources in outside environment 302 communicate with the program 306 executing in cell 204. For example, when the clock interrupt handler 310 of O/S 200 is invoked, master 202 must communicate the event to the program 306 executing in cell 204. Likewise, when a hardware (H/W) interrupt is invoked, the H/W interrupt handler of O/S 200 associated with the particular hardware event must communicate the event to the program 306 executing in cell 204. Master 202 provides a link or vector 304 between the program 306 executing in cell 204 and the outside environment 302 which is simple and restricted in order to keep implementation as simple as possible. The H/W interrupt is needed for communication with hardware peripherals, such as a network card accessed by the exemplary TCP/IP program 306 of FIG. 3. When a program 306 is executing in cell 204 which does not require communication with H/W peripherals, then there is no need for such H/W handler, which further simplifies operation of the system of the present invention.

One method for providing link 304 is by use of a passive memory link. The passive memory link is the most secure method, but is also the most restricting one. With a passive memory link, master 202 loads program 306 together with a specially created input buffer, into cell 204. Thus, the input buffer is already in the accessible memory area for program 306 when program 306 begins execution. Likewise, an output buffer is extracted by master 202 after program 306 is terminated. The benefit to this method is that there is no interaction, between program 306 and entities of outside environmental 302. The drawbacks to this method is that program 306 is not interactive with outside environment 302 during execution of the program 306. Communication is thus provided with only two transactions, an input to program 306 at the beginning of execution, and an output at termination of execution.

An alternative method for providing a link vector 304 between the program 306 and outside environment 302 is through a small shared memory segment with or without interrupts. A predefined part of the memory assigned to the program 306 to serve as shared memory. The area is used for communication between the program 306 and outside environment 302, or with master 202 itself. The program 306 may write data onto the shared memory, indicating the completion of the write by either flagging a bit in a preset position in a shared memory control block, or by invoking an interrupt as discussed below. Outside environment 302, or master 202, may later read the data, flagging its completion in a similar manner. Reading data by the program 306 is accomplished in similar fashion.

The shared memory link method may be implemented using dedicated interrupts. As part of cell 204, the master may install special link interrupt handlers, or stubs, for cell 204. The I/O stubs are responsible for moving data from the program's 306 allocated memory space to memory space in the outside environment, or master 204, and vice versa. The program 306 can perform I/O by invoking standard interrupt calls.

Another alternative method for providing a data link between the program 306 in cell 204 and outside environment 302 is through use of dedicated I/O ports. As part of cell 204, I/O ports can be reserved for the program 306. The I/O ports may be connected to a peripheral device such as a serial bus, parallel bus, NIC or SCSI device, etc., which in turn is connected to another peripheral device, connected to an I/O port for outside environment 302. Alternatively, to gain more security, the I/O port for outside environment 302 may be connected to master 202. In this way, the program 306 communicates with outside environment 302 by reading data from I/O port(s) and writing data to I/O port(s).

By using any of the above link methods, outside environment 302 may send/receive data either directly, or through master 202. Operating through master 202 has the advantage of being more secure, as master 202 becomes a mediator to the data arriving from the program 306. It is therefore possible, especially with respect to the second embodiment to have two programs effectively using a single resource, although in a very restricted, controlled manner, through a link as described above, and not transparently. This mechanism may be implemented in the by assigning a resource to a first program, which has complete control over it. This program may relay data to and from the resource to a second program using the restricted link between the two programs. Both programs are aware of this mechanism and take the necessary steps in its establishment and maintenance, making the mechanism non-transparent.

Figure 4:
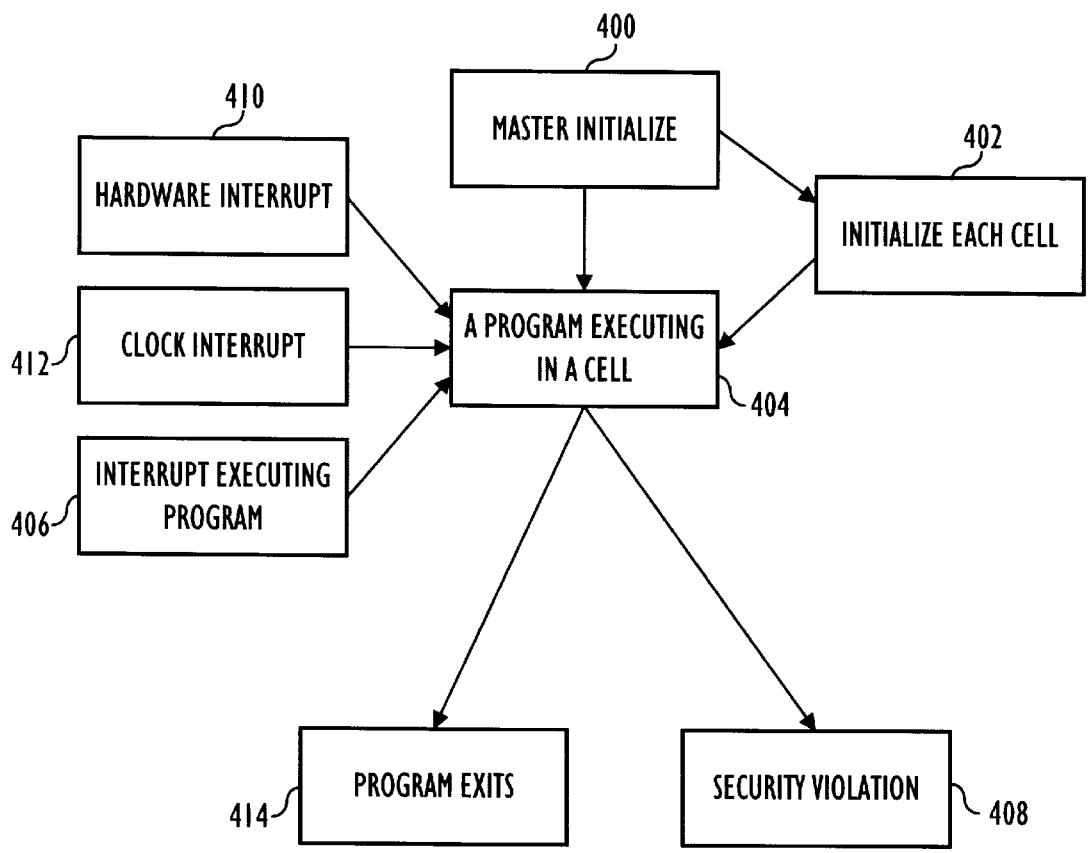
FIG. 4 is a flow diagram representing major operations for implementing the first embodiment of the present invention.

With reference to FIG. 4 the flow diagram depicted represents the major steps to implementing the first embodiment of the present invention. The first step is to initialize and load master 202 into memory which gains complete control over the CPU and sets up needed data, step 400. Next, each program 306 cell 204 is initialized, step 402.

Step 402 comprises several sub-steps. For each cell 204, an executable program 306 is loaded into physical memory. Memory is allocated for each cell 204, as well as hardware resources, CPU timing, interrupt vectors and any other resource supported directly by the CPU for the program cell 204. Master 202 then constructs each Cell by first setting up the CPU's protection, including I/O permission tables, virtual memory tables, interrupt re-direction maps, task tables, segmentation tables, etc., to isolate the program 306 from any memory or hardware except that allocated to it by master 202. The CPU's scheduling mechanism, or clock interrupt, is then set up to distribute CPU time between cells 204 and outside environment 302. The scheduling mechanism is then started.

Execution of each program 306 is then begun within each cell 204 as the CPU's scheduling mechanism allocates a time slice to each cell 204, step 404. As each program 306 executes, various requests from the program 306, e.g. I/O, are serviced, step 406. As services are provided, outside environment 302 is protected by disallowing each program 306 to access resources other than its allocated memory and the preset resources assigned to it, step 408. In case of an attempt to violate these restrictions, master 202 can terminate the program 306, or ignore the attempt, or take any other appropriate measure programmed into master 302. Hardware interrupts are handled by master 202, step 410, as explained in detail below, as well as clock interrupts, step 412. When a program 306 terminates, master 202 shuts down cell 204 and resets the memory allocated to cell 204, step 414.

In order to make it easier to confine a program 306 in a cell to only CPU level services a program 306 may be especially adopted for executing in cell 204. Software written from scratch can be coded to take into account the limited sharing environment of the present invention. For existing programs, the source code may be modified to eliminate all calls to services at the level of O/S 200. Otherwise, if the program 306 running in cell 204 attempts to use resources in outside environment 302 not assigned to it, master 202 may invoke an interrupt stub to ignore the request. For example, a program 306 that calculates an output buffer from an input buffer may attempt to write messages to a screen while it's processing the data when the screen has not been allocated to cell 204 by master 202. In such a case, where the attempt to violate the restrictions is expected, an interrupt stub for the resource, in this case, the stub for the write-to-screen interrupt, can be constructed such that instead of terminating the program 306 and/or informing outside environment 204, the interrupt stub simply ignores the request, emulating a successful operation, and returning control to the program 306. In this example, the interrupt stub for the write-to-screen interrupts should return to the program 306 with a successful status, emulating a successful write-to-screen, where in fact, nothing has happened. In this way, the program 306 may finish its task, terminating with the desired results, possibly in an output buffer. In this way, a program 306 can be executed in a cell without modification of the program 306.

Figure 5:
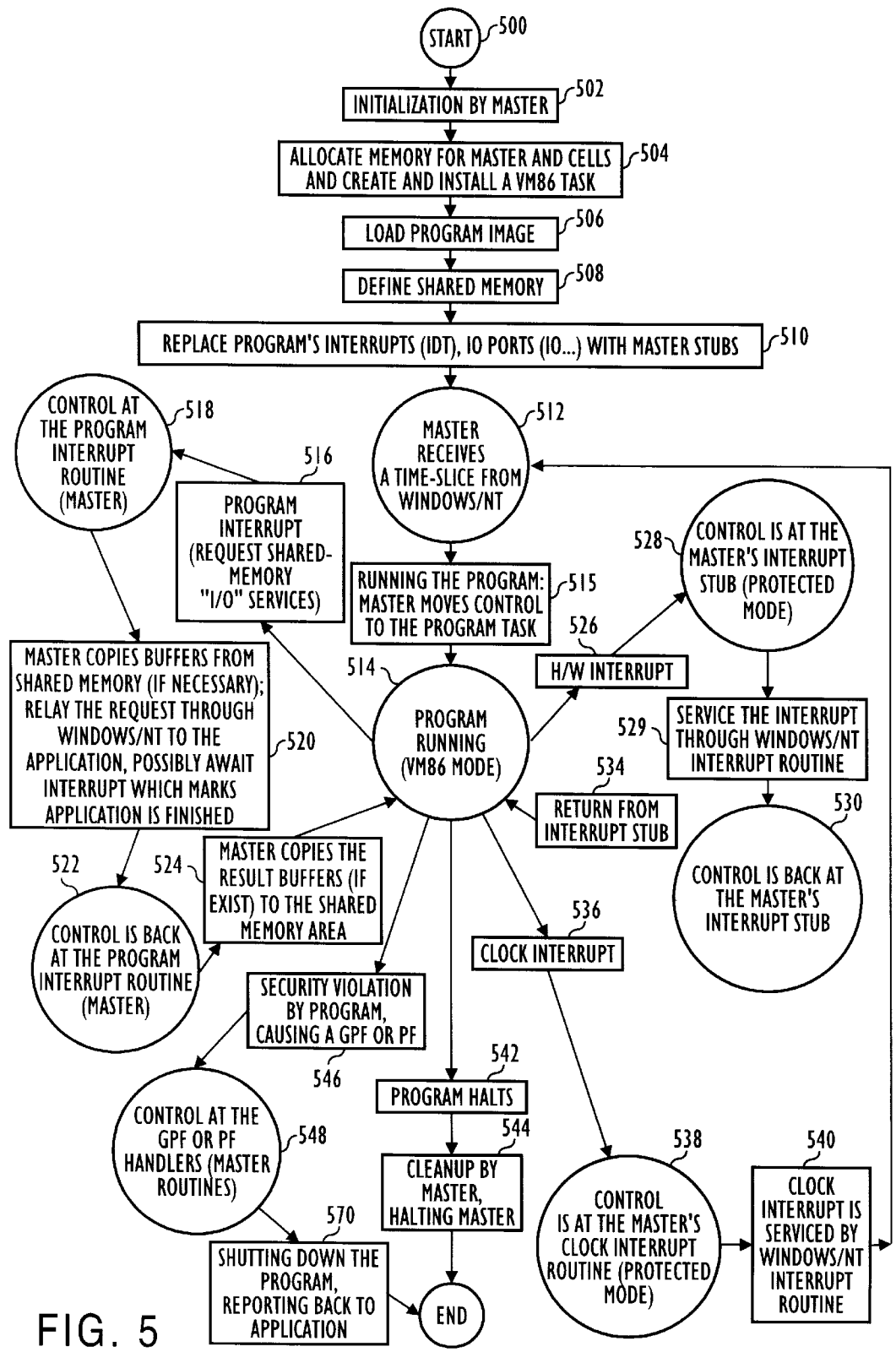
FIG. 5 is a detailed flow diagram representing system control of the first embodiment of the present invention.

With reference to FIG. 5, a control and data flow is depicted for the first preferred embodiment of the present invention. After the Windows/NT system is up and running, the system performs an initialization of a master 202, step 500. The system allocates memory for master 202 and a cell 204, step 502. The master creates a Windows/NT standard VM86 task, step 504. Next, master 202 loads a program 306 for execution into the cell 204, step 506. Master 202 then may define an I/O vector or buffer 304 for the program 306 to have limited contact with outside environment 302, or master 202 itself, step 508. The I/O buffer 304 may either comprise an interrupt, I/O port or a specially designated shared memory address space in RAM which can be strictly controlled and evaluated by master 202 before allowing access to the data vectored by the program 306 to other programs.

The last step in initialization comprises replacing the normal computer interrupt routines for the program 306 in cell 204 with interrupt handlers or stubs, step 510. The interrupt stubs can handle interrupt calls performed by the program 306 in a number of different ways which keeps the program 306 isolated from outside environment 302. For certain kinds of interrupts, such as calls to write to areas of the computer's physical memory addresses, an interrupt stub for that interrupt may terminate program 306 execution for cell 204 and return an error in any output buffers for the program 306. For other kinds of interrupts, such as screen output which may not be as crucial to the program 306 execution itself, an interrupt stub may handle the write-to-screen interrupt call by simply ignoring it. Different cells 204 may require different interrupt stubs depending on the program's 306 purpose and level of security with respect to the outside environment 302.

The memory allocation for a particular cell 204 may vary. With today's applications, one megabyte (1M) or more of memory may need to be allocated. Other programs, such as standard MS-DOS programs, require less than 1MB to execute. Step 502, comprising allocating memory also comprises creating a virtual memory mapping table. When the program 306 loads, the program 306 is not aware of any memory above or below the space allocated in RAM for the particular cell 204 the program 306 has been loaded in. To the program 306, the lower end of memory is, for example 0, and the upper end of memory equals the amount of space which has been allocated to cell 204. The table translates memory access interrupt calls from the program 306 to the physical memory address so that only the data allocated to that cell 204 is read or written.

To complete step 504 the master allocates a VM86 CPU task by inserting a task state segment (TSS) entry into a global description table (GDT), which contains pointers to TSS entries and shared memory segments or other loaded resources. A register within the TSS which points to the physical memory location of the page directory for the task for cell 204 is set. The VM86 bit in the EFLAGS register of the TSS is set so that the task is run in VM86 mode, as well as the current privilege level (CPL) for the TSS, which is set to 3, the least privileged level. A CPL of 3 means that the TSS is unable to modify its cell. The privilege level for the task or interrupt gate is similarly set to 3 for master services.

After the program 306 is loaded into cell 204 and ready for execution, the master requests a time-slice from Windows/NT for the cell 204, step 512. Once the time-slice is granted, control moves to the program 306, step 515, within cell 204 for its CPU time share, step 514. The program 306 executes as a VM86 task within cell 204, using standard long-jump instructions.

As with programs running in outside environment 302, a program 306 within cell 204 may trigger several events, or several events may interrupt execution of the program 306. One of those events is that the program 306 may encounter or produce a software I/O interrupt, step 516. If an I/O interrupt occurs, control is passed to the corresponding interrupt stub for an I/O installed in step 510. If cell 204 is one which allows limited input and output through an I/O interrupt, the cell stub may relay the request through Windows/NT to perform the I/O operation, step 520. Before doing so, a routine may be in place which checks the request to make sure it will not cause damage to Windows/NT or any other running applications in outside environment 302.

After processing the request, master 202 sends control back to the I/O interrupt stub for cell 204, step 522. If the I/O operation was a request for data, then master 202 routes the data from shared memory 304 to the program 306, step 524. The program 306 receives the input, if requested, and continues execution, step 514.

A hardware (H/W) interrupt may be produced while the program 306 is executing, step 526. Control is passed to the interrupt stub for the particular H/W interrupt produced, step 528. If the H/W interrupt is one which is allowed during execution of the program 306, cell 204 passes control to master 202, which then passes control to the particular Windows/NT routine, step 529, which services the H/W interrupt by switching the CPU back to NT mode, step 530. After the H/W interrupt is handled, control is passed back to the interrupt stub in VM86 mode, step 532, which in turn passes control back to the program 306, step 534.

The time slice allocated to the VM86 task may expire producing a clock interrupt, step 636. The interrupt stub for a clock interrupt receives the interrupt call, step 538. The clock interrupt is serviced by returning the CPU to NT mode and passing control to Windows/NT, step 540.

The program 306 may naturally terminate, step 542. The master then cleans up and returns allocated memory and resources used by the cell 204, and then releases control back to NT, step 544.

A program 306 may try to perform a prohibited operation, step 542. If this occurs, the CPU issues a general protection fault (GPF), step 546. Control is kept within master 202 and handled by shutting down the program 306 so as not to disturb other programs which are running under in Windows/NT, step 548. The master terminates execution of the program 306 and reports back to NT, step 570. Alternatively, the system may ignore the violation and return control to the program 306 for execution of further instructions.

Figure 6:
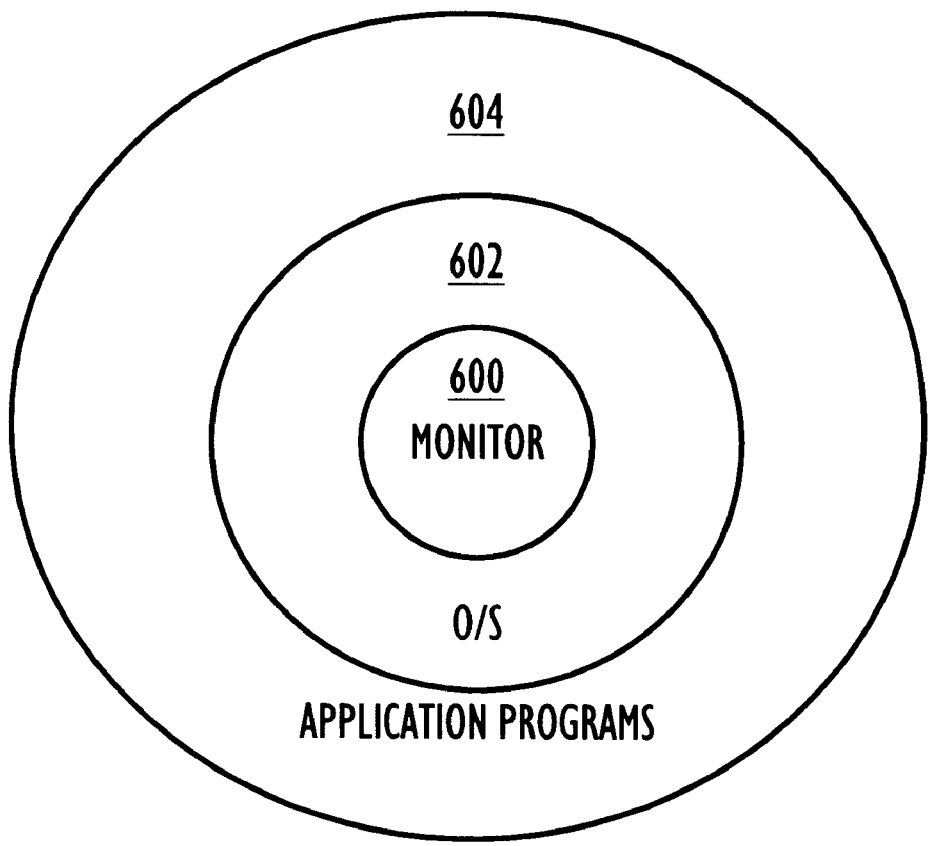
FIG. 6 is a ring diagram representing system layers of a second embodiment of the present invention.

With reference to FIG. 6, a second preferred embodiment of the present invention is employed to isolate several operating systems executing on one physical computer. An O/S monitor 600 gains full control of the computer. A monitor 600 can selectively enable or disable access to I/O ports and other memory locations. For example, monitor 600 can disable access to the I/O port for a floppy disk controller.

The second embodiment comprises an O/S layer 602 above monitor 600 which contains one or more simultaneously executing operating systems. User programs may execute in a an application layer 604 above the O/S layer 602.

An operating system is a particular type of program that does not assume O/S services. In the second embodiment of the invention the system uses monitor 600 as a mechanism which allows an O/S to assume it has full control over the computer by creating a virtual environment for the O/S.

The system traps any attempt of the confined O/S to re-program the security feature of the CPU, or any other O/S level feature, such as virtual memory. Monitor 600 services these attempts in a way similar to master 202 of the first embodiment described above. The system further traps any attempt to receive information about the state of the CPU's security features, and the monitor emulates the results of the CPU instruction which was supposed to be executed, without actually modifying the security configuration. The master may have to replace subroutines for an O/S because some CPU instructions on certain systems return information about the CPU state which cannot otherwise, without those replacements, be trapped. For example, an O/S such as Windows/NT running on Intel-Pentium may query the CPU to find the current privilege level in which it is running, expecting the result "0", which is the most privileged ring of execution. As this query is not trappable, each such instruction within the O/S is replaced with a call to a specially designed routine which emulates the desired result of 0.

Figure 7:
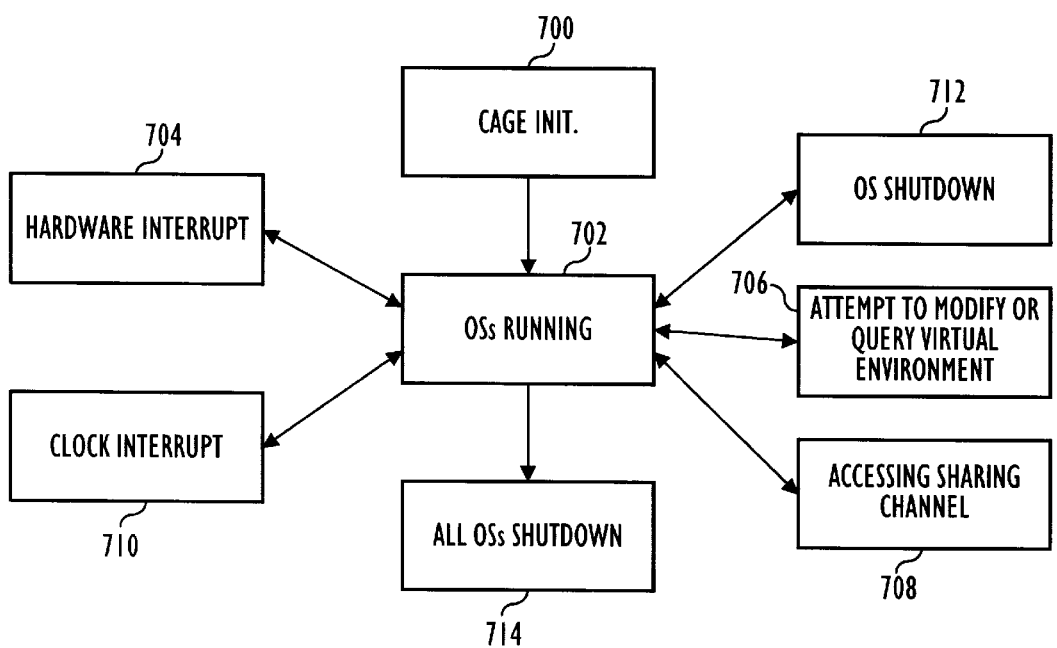
FIG. 7 is a flow diagram representing major operations of the second embodiment of the present invention.

With reference to FIG. 7 the flow diagram depicted represents the major steps for implementing the second embodiment of the present invention. At computer system boot-up, the first step is to initialize and load monitor 600 into memory, and execute it so that it gains complete control over the CPU, step 700. In step 700 CPU tasks are allocated by monitor 700 as explained in more detail below. Each O/S is loaded into their allocated task in step 700.

Execution of each O/S is then begun within each task as the CPU's scheduling mechanism allocates a time slice to each O/S, step 702. As each O/S executes, various requests from the O/S, for example I/O, are serviced, step 704. As services are provided, other O/S tasks are protected by disallowing each O/S from accessing resources other than its allocated memory and the preset resources assigned to it, step 706. In case of an attempt to violate these restrictions, monitor 600 can terminate the program, or ignore the attempt, or take any other appropriate measure programmed into monitor 600.

In the system of the second embodiment, an O/S may have read only access to special shared memory segments of other O/Ss, step 708, as explained in more detail below.

A clock interrupt is filtered through the monitor to the O/S running in the current time slice, step 710, or is trapped by the monitor, signaling it to move control to a different O/S.

When an O/S terminates, step 712, the monitor shuts down the task the O/S was executing in and resets the memory allocated to the task.

If the last O/S terminates, step 714, the monitor may shut down or change to configuration mode.

Figure 8A:
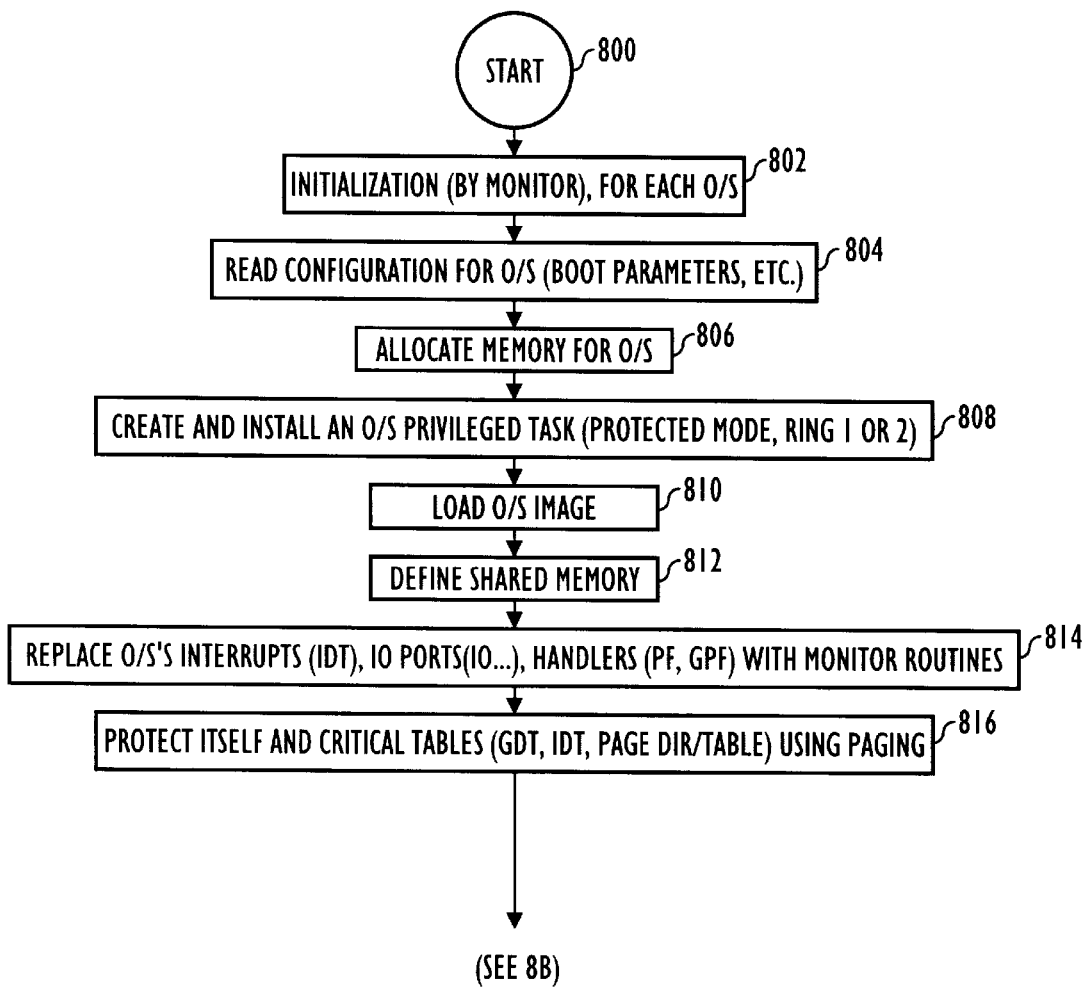
FIG. 8 is a detailed flow diagram representing system control of a second embodiment of the present invention.
Figure 8B:
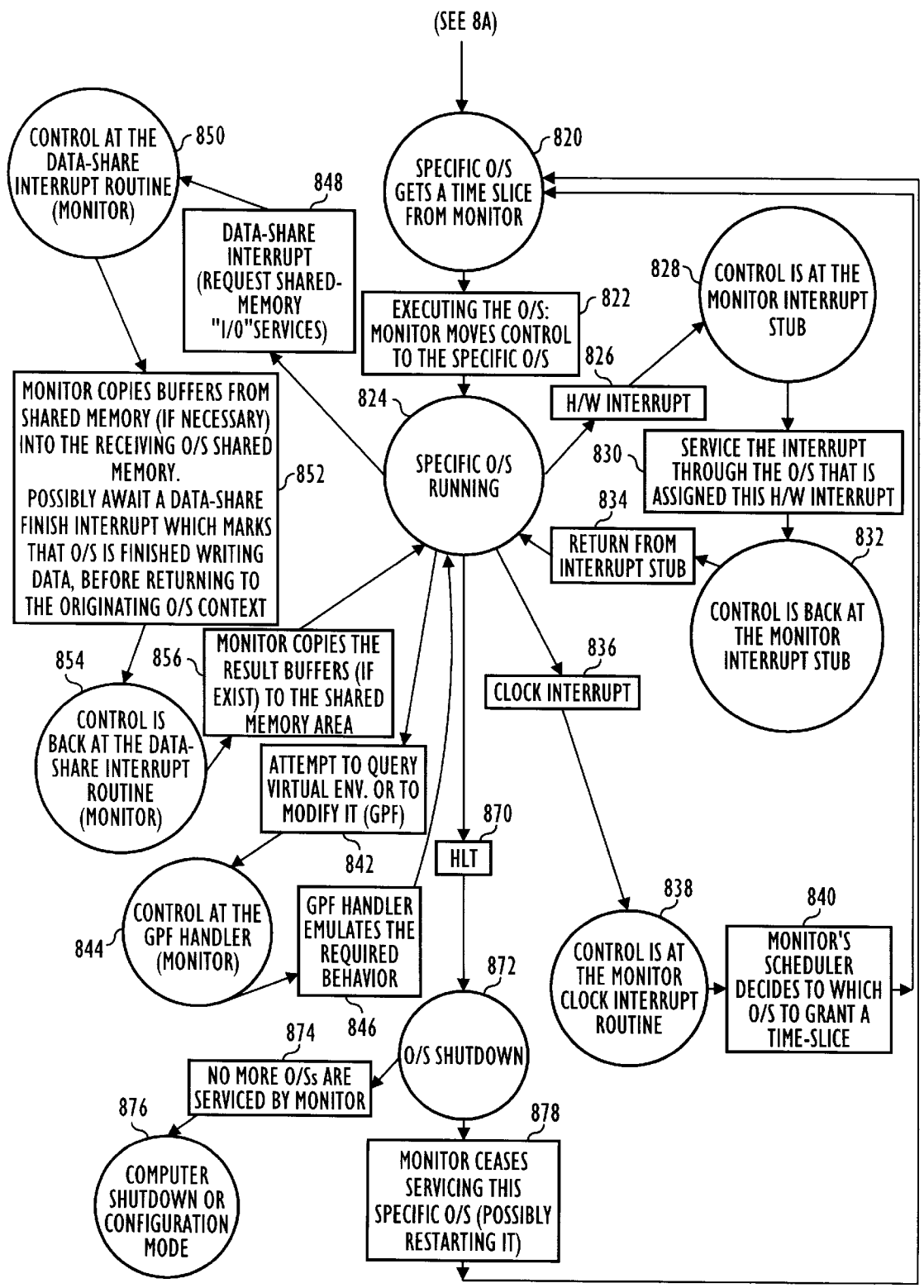

With reference to FIG. 8, a control and data flow is depicted for the second embodiment of the present invention. Initialization of the system occurs when the computer boots up, step 800. The monitor initially is inserted as the lowest layer above the computer's hardware interface.

The configuration information for each operating system (O/S) is read into the monitor, step 802. A virtual environment for each O/S is initialized which mimics the actual computer system's firmware. Alternatively, if a particular O/S is not compliant with the specific hardware of the computer system, an emulation layer can be installed by the monitor for that particular O/S.

Tasks are initiated with allocated memory pages for each O/S which is to be loaded, step 806. As in the first embodiment, each memory page is installed with a virtual memory address table so that the O/S is not aware of any other memory space other than that allocated to it. In this step, the monitor sets up low level segmentation, interrupts and any other security and control mechanism for the CPU. For each O/S a task is setup with a low permission level, either 1 or 2. The O/S is given an execution privilege which is still more privileged than the user applications running within the O/S itself, which can receive a permission level of 3. However each O/S receives a permission level which gives it less privilege than the monitor itself, which runs at the most privileged execution layer of the system, level 0. Each O/S can be allocated CPU time as with application programs in the first embodiment, step 808. A time scheduler to distribute time between the O/Ss is setup, step 810.

Next, the O/S images are loaded into their respective task spaces, step 812. As in the first embodiment, limited shared memory may be set up between O/Ss, step 814. However, the shared memory is not activated in this step. Further, protection of critical tables, such as GDT and IDT page directory and page tables is provided by the monitor, step 816. If available, this protection can be achieved by using a CPU paging mechanism such as the paging mechanism built into Intel's PENTIUM processor.

Next, exception and interrupt handlers replaced for each O/S cell, step 818. This step is similar to step 510 in the first embodiment described above. However exception handlers for operating systems are more extensive than for applications. For example, a general protection exception handler is installed to enable the Windows/NT O/S to run in layer 602 (FIG. 6) by carefully emulating privileged instructions for the Windows/NT O/S on behalf of the CPU. A page fault exception handler implements the protection on critical tables to trap references to memory areas which do not belong to the O/S causing the page fault.

Once the O/Ss are loaded and ready for execution, the first O/S on the time slice stack will retain a time slice from the CPU, step 820. The monitor's scheduling mechanism grants time slice for an O/S, causing it to run in its own virtual environment. If this is the first time the O/S runs, then the virtual environment emulates a user or automatic boot-up sequence, as expected by the O/S. Otherwise, the O/S resumes running where it was stopped, step 824.

As with the first embodiment, a number of events may occur during a running O/S's CPU time slice, one of which may be a H/W interrupt, step 826. The interrupt stub for the particular hardware must determine which O/S the interrupt should be routed to, step 828. This may depend on the hardware resource which the specific piece of hardware is allocated to. In the second embodiment, service of the interrupt is assigned to the O/S which the hardware is servicing, step 830. Control is then passed back to the monitor interrupt stub, step 832, which passes control back to the O/S which has been allocated the current time slice, step 834.

Similarly to the first embodiment, a clock interrupt causes the current O/S to stop, step 836. However, unlike the first embodiment, control is transferred to the next O/S, step 838. The monitor simply arbitrates which O/S is to receive the next time slice, step 840.

Any attempt to modify the virtual environment by an O/S, step 842, such as changing an interrupt or modifying a virtual page directory, causes the CPU to generate a general protection fault, step 844. This fault is handled by the monitor, which emulates the modification so that it appears to the O/S that the modification was successful, step 846.

In case a reference or request is made to the virtual environment it can be trapped, or intercepted by a CPU mechanism. There are interrupts that may be activated as a result of such an attempted reference. In a case where there is no way for CPU to trap references to the environment, for example using the segment register to determine the current permission, the O/S must be patched by replacing the problematic instruction with a call or branch to special code which emulates the action, returning the expected result to the O/S so that the monitor can be used to confine it. If the O/S references the segment register directly, it may not be trappable/interruptable. In this specific scenario, the monitor's existence may not be transparent to the O/S because the segment register contains information which discloses the fact that the O/S is running with a monitor, and is less privileged than expected. So, the O/S may not behave well after receiving this information. One way to resolve this is to completely remove the instruction from the O/S which discloses the information. For example, the read-segment-register instruction may be replaced with a call to a monitor routine which emulates the call so that the routine provides the expected result. This type of patch is made prior to the execution of the code, e.g. at the binary, or just after loading the O/S image, in the memory image of the O/S.

Each O/S has a shared memory page for which only it has write privileges, and can be read by any other O/S. For an O/S requesting data from another O/S to take advantage of this page, it sends a request to the monitor to activate it by invoking a software interrupt, step 848. A special driver is loaded which facilitates information sharing between the O/Ss, step 850. The requesting O/S may initiate a finish interrupt once it receives the data, step 852. Control then passes back to the monitor's data-share interrupt routine, step 854, which finishes execution. The monitor copies the result buffers, if any, to shared memory, step 856.

When the O/S invokes a halt (HLT) instruction, step 870, the monitor ceases to allocate time for the calling O/S, step 872. The monitor ceases servicing the specific O/S invoking the HLT instruction, and may possibly restart it, step 878. If all O/Ss shutdown, step 874, the monitor may either shutdown the computer or, alternatively, move to configuration mode, step 876. This mode can also be activated by a special hot-key combination.

Both the first and second embodiments of the present invention can be implemented on any processor supporting isolation and/or protection mechanisms such as privilege levels, virtual machines and paging memory. Intel's 80386 or higher (80386+) protected mode and Intel's 80386+ VM86 mode is supported by the system. The monitor supports any operating system consistent with protective mode that is used for the isolation. For example Linux, Windows/95, Windows/NT, Solaris/x86, all operate on Intel's 80386+ protected mode. MS-DOS cannot be used in Intel's 80386+ real-mode, because no protection/isolation is offered in this mode, but the system may be implemented using VM86 mode for MS-DOS.

The system of the present invention can be used with other, similar processors. It should be understood that the system of the present invention is not restricted to the Intel 80386+ architecture.

Programs which are CPU intensive work best with the system of the present invention because of the reduced need for environmental resources, although other programs which are less CPU intensive may be executed within a cell. The preference is to limit operating system services needed to for each cell. The system works best with programs' for which, once all the required input is given, most of the programs' activities occur within each cell's allocated memory segment, while using limited I/O functions, if at all. A good example of an application to which executes best with the system of the present invention is a protocol processor, such as an SSL decryptor or HTTP parser, because it is CPU intensive, while having low demand for I/O other than an initial input buffer and final output buffer.

Figure 9:
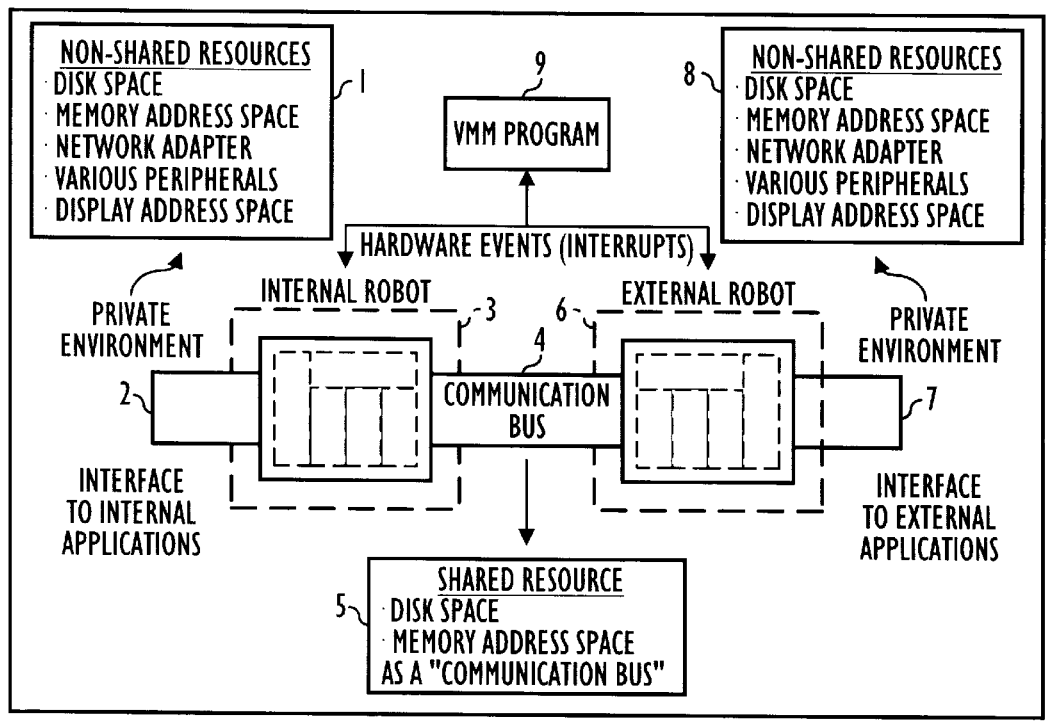
FIG. 9 is a block diagram of a gateway system employing the security architecture of the present invention.

The system of the present invention may be used to operate two or more programs which form a security gateway system for protecting an internal trusted network from the external environment. An example of such a gateway system having two discrete programs or robots is described in a copending, commonly owned U.S. application Ser. No._____ for a METHOD AND SYSTEM FOR PROTECTING OPERATIONS OF TRUSTED INTERNAL NETWORKS, filed on even date herewith, which is hereby incorporated by reference into this application. As described in that application, and as shown in FIG. 9, an external program or robot 6 receives messages from the external environment 7, converts the content of these messages to a simple, harmless form, and passes them along to an internal robot 3 which converts the simplified form of the content to a form usable by applications in the internal network 2. The external and internal robots 6, 3 may be operated on a single processor while maintaining security of the internal network 2 using the systems described herein. For example, the external robot 6 may be operated in the restricted operating environment so that attacks on the external network will not proliferate into the rest of the operating environment including the internal robot. Alternatively, both the external and internal robots 6, 4 may be operated in restricted environments, thus providing further protection.

The two robots 4, 6 are implemented on a single CPU using a protected mode such as the VM86 mode or the restricted operating environment provided by the master or monitor programs represented as VMM program 9 and Pentium technology. For example, in a single CPU running the Windows NT™ (WINNT) operating system, each robot, or at least the external robot 6, is operated in protected mode under the supervision of a monitor program which prevents each robot from affecting the operation of the other and the rest of the CPU's environment. The monitor program also negotiates the communication of data between them, implementing the communication channel or bus 4 between them using shared memory resources 5 and a special API for each protected mode. Thus, the two software robots 4, 6 are separated by the CPU under the control of the VMM program in a way that each robot is assigned some resources of the computer 1, 8 (such as disk space, memory address range, peripheral devices like floppy disks or tape drives) which are not shared with the other robot, and the policy of separation is enforced by the VMM program. Only one resource, the communication bus 28, is shared by the two robots 4, 6, and this bus 4 may be implemented, for example, by a dedicated memory address space.

The VMM program 9 and the robots 4, 6 running in their private environments may be executed on a dedicated computer. They may also run on a non-dedicated computer, in which case certain modification to the standard OS (e.g., Windows) might be necessary in order to force it to run in a protected mode. The VMM program 9 controls all the events at the CPU level, and enforces the two virtual processing entities on a single CPU machine by hardware interrupts.

The invention has been described with particular reference to presently preferred embodiments thereof, but it will be apparent to one skilled in the art that variations and modification are possible within the spirit and scope of the invention.

What is claimed is:

1. A method for protecting an operating environment on a processor from a first program operating on the processor, the method comprising:
   allocating memory space for use only by the first program while the first program is executing;
   allowing communication between the first program and the operating environment through only a single link employing a single method selected from the group consisting of a shared memory space, a dedicated interrupt, and a dedicated I/O port; and
   managing a restricted operating environment for the first program on the processor, the restricted operating environment preventing the first program from accessing resources on the processor except for the allocated memory space and the single communication link.

2. The method of claim 1, comprising executing the first program within the restricted operating environment.

3. The method of claim 2, comprising terminating execution of the first program upon an attempt by the first program to access a resource on the processor which is restricted by the restricted operating environment.

4. The method of claim 2, comprising ignoring any request by the first program to access a resource on the processor which is restricted by the restricted operating environment and attempting to continue execution of the first program without granting access to the restricted resource.

5. The method of claim 2, comprising allowing the operating environment to access the allocated memory space only prior to execution of the first program and after termination of first program execution.

6. The method of claim 5, comprising the operating environment writing data to the allocated memory space for use by the first program prior to execution of the first program, and the operating environment reading data generated by the first program from the allocated memory space after termination of first program execution.

7. The method of claim 1, wherein the step of allowing communication between the first program and the operating environment comprises allowing communication through only the shared memory space.

8. The method of claim 7, comprising the first program and operating environment each writing data to the shared memory space and indicating the availability of the data written to the shared memory space by setting a bit in a predefined location in the shared memory space.

9. The method of claim 8, comprising the operating environment and first program reading the data written to the shared memory space when the bit is set.

10. The method of claim 1, wherein the step of allowing communication between the first program and the operating environment comprises allowing communication through only the dedicated interrupt.

11. The method of claim 10, comprising handling the dedicated interrupt by moving data written by the first program to the allocated memory space to memory space of the operating environment or by moving data from memory space of the operating environment to the allocated memory space.

12. The method of claim 1, wherein the step of allowing communication between the first program and the operating environment comprises allowing communication through only the dedicated I/O port.

13. The method of claim 1, comprising, upon the occurrence of a hardware interrupt in the processor while the first program is executing, handling the hardware interrupt through an interrupt routine in the operating environment.

14. The method of claim 1, wherein the first program is an operating system.

15. A method for protecting an operating environment on a processor from a first program operating on the processor, the method comprising:
   allocating memory space for use only by the first program while the first program is executing;
   allowing the operating environment to access the allocated memory space only prior to execution of the first program and after termination of first program execution;
   executing the first program; and
   managing a restricted operating environment for the first program on the processor, the restricted operating environment preventing the first program from accessing resources on the processor except for the allocated memory space.

16. The method of claim 15, comprising the operating environment writing data to the allocated memory space for use by the first program prior to execution of the first program, and the operating environment reading data generated by the first program from the allocated memory space after termination of first program execution.

17. A system for protecting an operating environment on a processor coupled to a memory device from a first program operating on the processor, the system comprising:

an allocated memory space in the memory device for use only by the first program while the first program is executing;

a communication link between the first program and the operating environment employing a single method selected from the group consisting of a shared memory space, a dedicated interrupt, and a dedicated I/O port; and a mediator program for managing a restricted operating environment for the first program on the processor, the restricted operating environment preventing the first program from accessing resources on the processor except for the allocated memory space and the single communication link.

18. A method for operating a plurality of operating systems on a single processor, the method comprising:

allocating sets of resources on the processor, each set being available for use by only one of the plurality of operating systems;

allowing each of the operating systems to operate on the processor and access the set of resources available to the respective operating system;

upon an attempt by a first of the operating systems to access one or more resources outside the set of resources available to the first operating system, determining which set of resources contains the one or more resources attempted to be accessed and determining a which second operating system of the other operating systems has such set available to it; and handling such attempted access of one or more resources through the second operating system.

19. The method of claim 18, wherein the one or more resource attempted to be accessed by the first operating system is a hardware interrupt issued by the first operating system.

20. The method of claim 18, comprising handing a H/W interrupt invoked by a peripheral wherein the monitor determines which operating system services the interrupt.

21. A system monitor for operating a plurality of operating systems on a single processor comprising:

means for allocating sets of resources on the processor, each set being available for use by only one of the plurality of operating systems;

means allowing each of the operating systems to operate on the processor and allowing access to the set of resources available to the respective operating system;

means for determining, upon an attempt by a first of the operating systems to access one or more resources outside the set of resources available to the first operating system, which set of resources contains the one or more resources attempted to be accessed and for determining which second operating system of the other operating systems has such set available to it; and means for handling such attempted access of one or more resources through the second operating system.

* * * * *

UNITED STATES PATENT AND TRADEMARK OFFICE
CERTIFICATE OF CORRECTION

PATENT NO. : 6,199,181 B1  Page 1 of 1
DATED : March 6, 2001
INVENTOR(S) : Reshef et al.

It is certified that error appears in the above-identified patent and that said Letters Patent is hereby corrected as shown below:

<u>Title page,</u>
Item [12], replace "Rechef" with -- Reshef --;

Item [75] Inventors, replace "Rechef" with -- Reshef --;

ABSTRACT, line 14, after "space" insert -- in --;

<u>Column 14,</u>
Line 35, delete "to".

Signed and Sealed this

Twelfth Day of March, 2002

Attest:

Attesting Officer

JAMES E. ROGAN
Director of the United States Patent and Trademark Office